United States Patent

[11] 3,604,282

[72] Inventors  Howard G. Shambaugh
                River Forest;
                Henry W. Faulstich, Chicago, both of, Ill.
[21] Appl. No.  865,259
[22] Filed       Oct. 10, 1969
[45] Patented    Sept. 14, 1971
[73] Assignee    Lovejoy, Inc.
                 River Forest, Ill.

[54] POSITIVE DRIVE, VARIABLE SPEED STRUCTURE
     11 Claims, 7 Drawing Figs.
[52] U.S. Cl. .................................................. 74/230.17
[51] Int. Cl. ................................................... F16h 55/52
[50] Field of Search ........................................ 74/230.17,
     230.18, 230.16, 230.5, 230.14, 244; 29/159

[56]              References Cited
              UNITED STATES PATENTS
747,478   12/1903   Reed ............................ 74/244
1,847,567  3/1932   Lorenz ......................... 29/159
3,170,381  2/1965   Wanielista ................... 74/220.01
              FOREIGN PATENTS
623,468    7/1961   Canada ........................ 74/230.17 C Primary Examiner—C. J. Husar
Attorney—Parker, Carter & Markey ABSTRACT: A positive drive, variable speed structure including an elongated slotted strip cut to length and looped with abutting ends to form a circular belt support and mounting means for the support, including pulley means having concentrically grooved opposing faces for reception of the strip support.

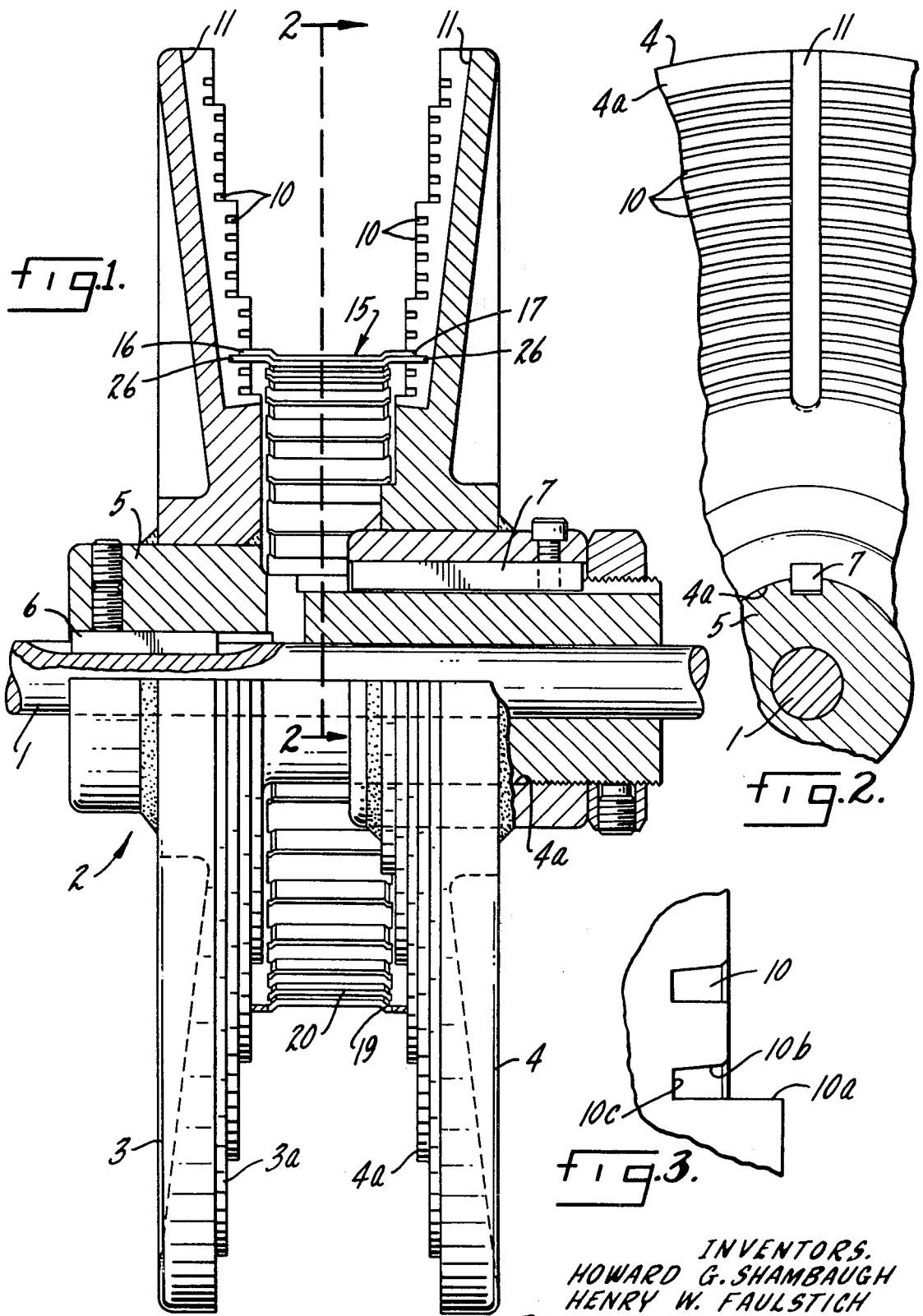

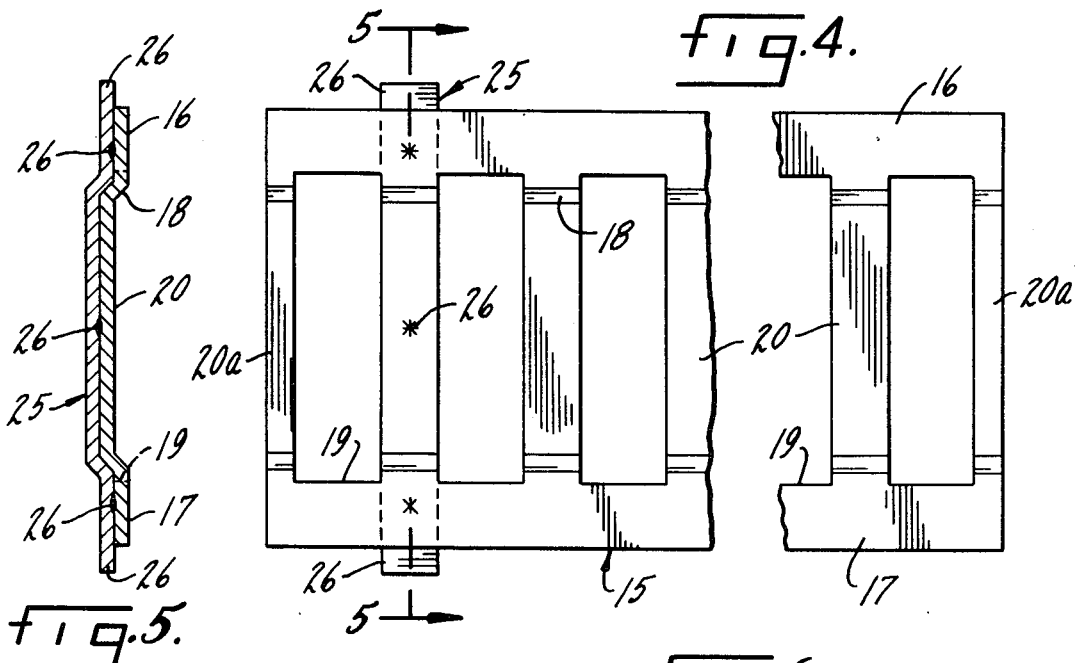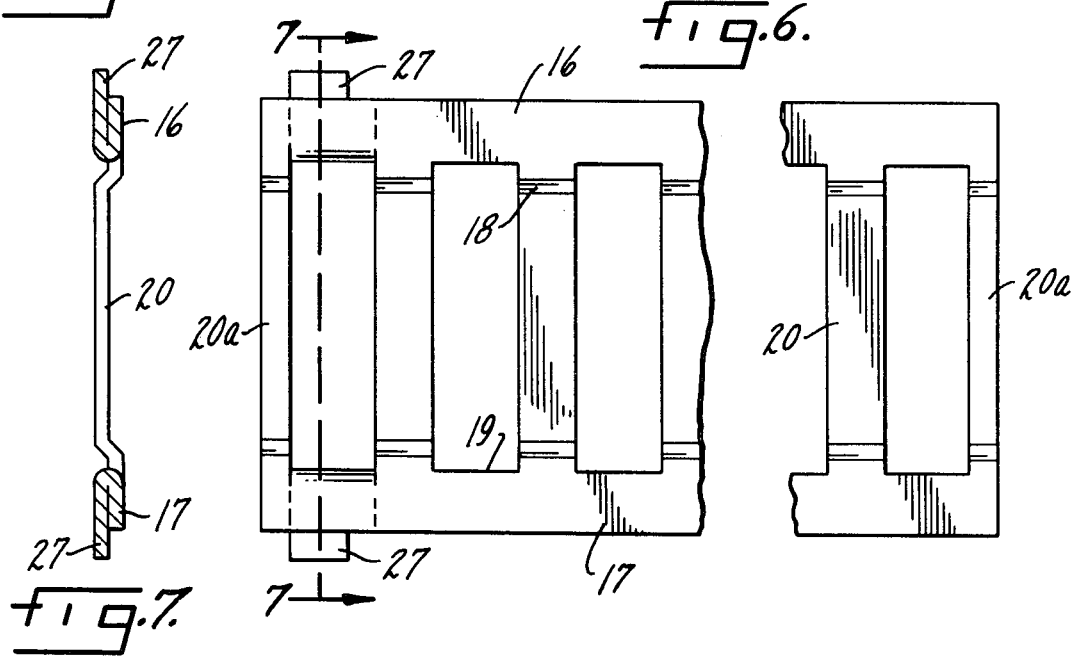

3,604,282

POSITIVE DRIVE, VARIABLE SPEED STRUCTURE

SUMMARY OF THE INVENTION

An elongated, centrally slotted strip of bendable material is provided. A suitable length is cut from said strip and looped to abut its ends to form a belt support of predetermined diameter. The slotted portion of the strip is offset from the remainder thereof to insure that the pitch diameter and pitch dimension of the strip corresponds to the pitch diameter and dimension of a toothed drivebelt. Means for rotatably mounting the strip support include relatively movable pulley segments having concentrically grooved, opposed faces. Radial slots in said faces cooperate with ears formed on the strip to preclude relative rotation between the strip and pulley segments.

This invention relates to variable speed devices and has particular relation to a positive drive, nonslip, variable speed structure.

One purpose of the invention is to provide a positive drive, variable speed device of maximum economy in manufacture and use.

Another purpose is to provide a positive drive, variable speed device requiring a minimum of tools, labor and time to assemble and to vary the speed thereof.

Another purpose is to provide a variable speed structure including a rotatable mounting means and a supply of strip material from which varying lengths may be removed for assembly with the mounting means.

Another purpose is to provide a variable speed device wherein minute incremental adjustments of speed ratios may be achieved at minimum cost and without the requirement for skilled labor.

Another purpose is to provide a variable speed mounting means and a plurality of varying-diameter belt support members therefor.

Another purpose is to provide a method of forming a variable speed device and a method of varying the speed thereof.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side elevation in partial cross section;

FIG. 2 is a detail view taken on line 2—2 of a portion of FIG. 1;

FIG. 3 is a detail view of an enlarged scale of another portion of FIG. 1;

FIG. 4 is a top plan view of a belt support of the invention;

FIG. 5 is a view taken on the line 5—5 of FIG. 4;

FIG. 6 is a top plan view showing a variant of the structure of FIG. 4; and

FIG. 7 is a view taken on the line 7—7 of FIG. 6.

Like parts are indicated by like numerals throughout the specification and drawings.

DESCRIPTION OF THE PREFERRED EMBODIMENT

Referring now to the drawings, and particularly to FIG. 1, a shaft 1 has fixed thereon and for rotation therewith a pulley indicated generally by the numeral 2 and formed of pulley segments 3, 4. The segments 3,4 are suitably arranged for relative motion toward and away from each other. For example, the pulley segment 3 includes an elongated axial boss portion 5 through which the shaft 1 extends and which is keyed to shaft 1 in any suitable manner, such as that indicated at 6. The pulley segment 4 is slidably received on the extension of boss 5, the central bore 4a in segment 4 providing therefor. Segment 4 is keyed to boss 5 against relative rotation therewith by any suitable means, such as that indicated generally at 7.

A plurality of concentric grooves 10 is formed in each of the opposed faces 3a, 4a, respectively, of the pulley segments 3,4. It will be understood that the grooves 10 may vary in number and spacing. Preferably, however, the number and spacing of the grooves 10 corresponds to the expected diameters to be employed in varying the speed of the structure of the invention, as described more fully hereinbelow. A radially disposed slot 11 is formed in each of the faces 3a, 4a.

Referring now to FIG. 4, an elongated strip 15 of bendable material has spaced, parallel, coplanar, longitudinal edge portions 16,17. The elongated central portion of strip 15 is offset from the plane of edge portion 16,17, as indicated at 18, and is slotted substantially throughout its length as indicated by the slots 19. The joinder strips 20 between each pair of slots 19 join the edge portions 16,17 and lie in a plane paralleling that of said edge portions.

It will be realized that the strip illustrated in FIG. 4 may be a length cut from an identical elongated strip of indeterminate length, the cuts thus forming the ends of the strip 15 being preferably made through one of the joinder portions 20 and resulting in half-width portions 20a at the opposite ends of strip 15.

As may be best seen in FIGS. 4 and 5, a lock strip 25 is secured, as by spot welds 26, to the underside of a joinder portion 20 adjacent one end of the strip 15. The lock strip 25 has its central portion deformed to match the joinder portion 20 and has elongated end portions extending beyond the longitudinal edges 16,17 to provide the locking ears 26 for reception within the slots 11, as shown in FIG. 1. It will be understood that the ears 26 could, if desired, be formed of individual ear pieces suitably secured, as by spot welding, beneath and extending outwardly from the edge portions 16,17 without departing from the nature and scope of the invention.

Ready-to-use, precut strips 15 of predetermined length may be provided. In such event the ears 26 may be secured as above described. Alternatively, the ears could be formed in the manner illustrated in FIGS. 6 and 7. In such event, in the formation of strip 15 a portion of the material separated to form an end slot 19 may be bent downwardly and then upwardly against the underside of each edge portion 16,17. Thereupon the portions extending beyond the edges 16,17 may be trimmed in length and width for locking reception in the slots 11, the thus formed ears being indicated at 27 in FIGS. 6 and 7.

As may be best seen in FIG. 3, the concentric grooves 10 have a bottom wall surface 10a lying parallel with the axis of shaft 1 and an upper wall surface 10b lying in a plane diverging from the surface 10a outwardly from the inner or base wall 10c of groove 10.

As best seen in FIG. 1, the grooves 10 may be conveniently arranged in groups, the innermost groove of each group having an elongated bottom wall for ease in identifying major or more commonly used diameters for the belt support or hub formed of strip 15.

The use and operation of the invention are as follows:

It will be understood that a strip of indeterminate length may be made available with the configurations 16, 17, 18, 19 and 20. In forming the variable speed device of the invention, the operator may remove from said roll a predetermined length of said strip. The operator may then attach locking strip 25 or individual earpieces to the underside of the edge portions 16,17 of the strip 15 thus removed to provide locking ears 26.

With the pulley segments 3,4 separated, the selected strip 15 is then looped to bring its opposite ends, having the joinder portions indicated at 20a, in abutting relationship. One of the earpieces 26 is then placed in the groove of one of the pulley segments. In the form illustrated, for example, an ear 26 would be placed in the slot 11 of fixed pulley segment 3 and an edge portion 16 placed in the appropriate groove 10 of segment 5. Thereupon the movable pulley segment 4 will be moved along the boss 5 to position the opposite earpiece 26 in the slot 11 formed in segment 4. At the same time, the edge portion 17 will be received in the appropriate groove 10 of the pulley segment 4. The segment 4 is then secured against relative rotation with boss 5 as by means 7 and the device is in condition for operation.

The concentric grooves 10 guarantee that the strip 15 will provide a circular belt support or hub for the pulley 2 of precisely the desired diameter and resulting pulley r.p.m. or speed.

The pitch diameter of a toothed drivebelt (not shown) runs through the body of the belt and its pitch dimension changes, as the diameter of the belt portion turning about the pulley 2 is varied. Correspondingly, the pitch diameter of strip 15 runs through edge portions 16,17 and its pitch diameter changes, as does that of the belt, as the diameter of the strip 15 is varied.

When the operator decides to vary the speed of the structure 2, i.e. to vary the speed ratio of rotatable mechanisms of which the structure 2 is one, a strip 15 of an appropriate length is provided and arranged in the manner above described. When the desired lengths are previously known, it will be understood that the ears 27 may be formed as illustrated in FIGS. 6 and 7 and precut strips 15 of varying lengths receivable in corresponding grooves 10 may be supplied with ears 26 or 27 provided on such ready-to-use strips 15.

The diameter or circumference of the slotted strip forming the belt support 15 may be varied in increments as small as that of one tooth or one pitch. For example, a groove 10 having a diameter of 7.96 inches would receive a strip 15 having a length of 25 inches. If the slots 19 were formed to match a standard timing belt having ½ inch pitch, there would thus be 50 slots 19 in such strip 15. Should a 2 percent speed change be desired, the operator merely removes ½ inch from such strip 15, leaving 49 slots 19 to engage the timing belt. The diameter of the strip 15 would thus be reduced to 7.80 inches and the strip would be receivable in the next smaller diameter grooves 10 of the pulley 2.

Similarly, the pulley speed of the structure having a strip 15 of 25 inches in length, as above described, could be doubled in r.p.m. by cutting the strip 15 in half, i.e. to a length of 12½ inches. The resulting strip would be looped to a diameter or 3.98 inches, would be received in the appropriately smaller diameter grooves 10 of pulley 2 and would contain 25 slots 19 for engagement with the timing belt described.

While the foregoing examples have been described with respect to a single strip 15 having a first length reduced to increase speed, it will be understood that similar relationships obtain when stripsof predetermined length and diameter are initially supplied for provision of increased or decreased pulley r.p.m. and when strips 15 of varying lengths are removed from a coil or roll (not shown) of an indeterminate length of strip having the edge and slotted portions shown in strip 15.

The embodiments of the invention in which an exclusive property or privilege is claimed are defined as follows:

1. A positive drive, variable speed pulley structure including a belt support formed of a strip of bendable material having a predetermined length and bendable to abut its opposite ends and to form said strip in a circle having a predetermined diameter, said strip having a longitudinal edge portion and a longitudinal slot portion, a plurality of substantially equisized, longitudinally spaced slots formed throughout substantially the entire length of said slot portion, and variably spaced rotatable means supporting said strip for rotation therewith.

2. The structure of claim 1 wherein said edge and slot portions lie in spaced parallel planes.

3. The structure of claim 1, wherein said slot portion is offset inwardly of said edge portion when said strip is formed in said circular configuration.

4. The structure of claim 1, wherein said mounting means includes a pair of pulley segments relatively movable toward and away from each other.

5. The structure of claim 4 characterized by and including a plurality of concentric grooves formed in the opposing faces of said pulley segments, the grooves of one of said pulley segments being aligned with the grooves of the other of said pulley segments.

6. The structure of claim 5 wherein said grooves are arranged in groups radially of said pulley segments.

7. The structure of claim 5 wherein each of said groups of grooves are offset axially from the other of said sets.

8. The structure of claim 4 characterized by and including means for securing said pulley segments against relative rotation, said means including an axially extending boss on one of said segments, a bore on the other of said segments and receiving said boss and means securing said other of said pulley segments against relative rotation with respect to said boss.

9. The structure of claim 4 characterized by and including ear and slot means on said strip and pulley segments and engageable to preclude relative rotation between said strip and said pulley segments.

10. The structure of claim 9 wherein said means includes a radial slot in at least one of said pulley segments and an ear extending laterally from said strip for reception in said slot.

11. The structure of claim 10 where said ear is formed of an integral piece of said strip, said piece being bent from said strip in forming one of said slots.